INVENTOR
H. H. MERWIN
BY
E. R. Nowlan
ATTORNEY

Patented May 27, 1947

2,421,347

UNITED STATES PATENT OFFICE 2,421,347

MATERIAL HANDLING APPARATUS

Harry H. Merwin, Rutherford, N. J., assignor to Western Electric Company, Incorporated, New York, N. Y., a corporation of New York Application March 31, 1944, Serial No. 528,845

7 Claims. (Cl. 242—45)

This invention relates to a material handling apparatus, and more particularly to apparatus for reeling lead covered cable.

An object of the invention is to provide a material handling apparatus which is particularly adaptable for reeling cable and for maintaining a given tension thereon.

With this and other objects in view, the invention comprises a carriage for rotatably supporting a reel operable to wind a material thereon received from a supply at a constant rate of speed, and means to apply a force to the carriage tending to move it away from the supply to create a given tension in the material.

Other objects and advantages will be apparent from the following detailed description when considered in conjunction with the accompanying drawings, wherein Fig. 1 is a side elevational view of the apparatus;

Figure 1:
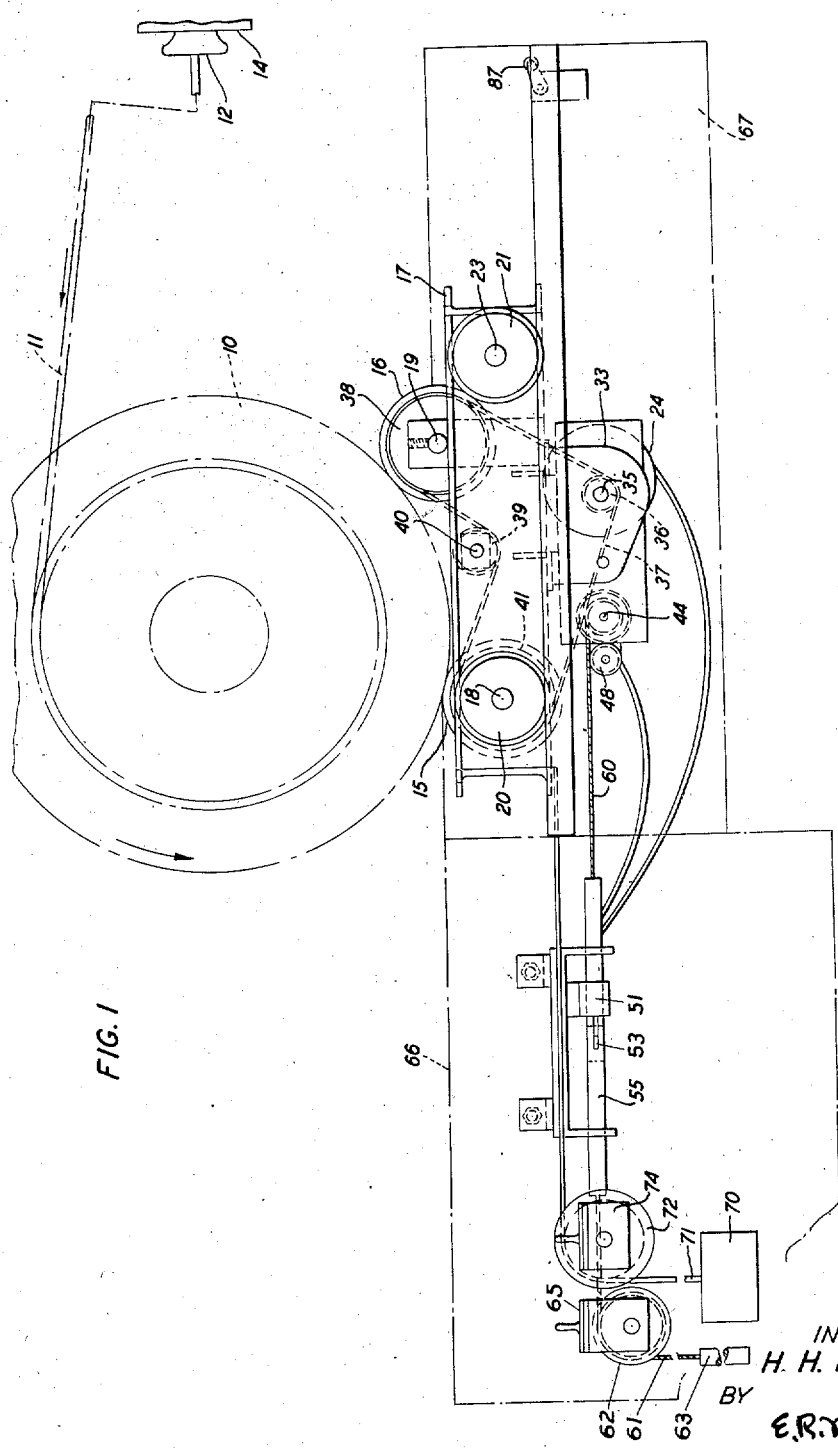
Figure 2:
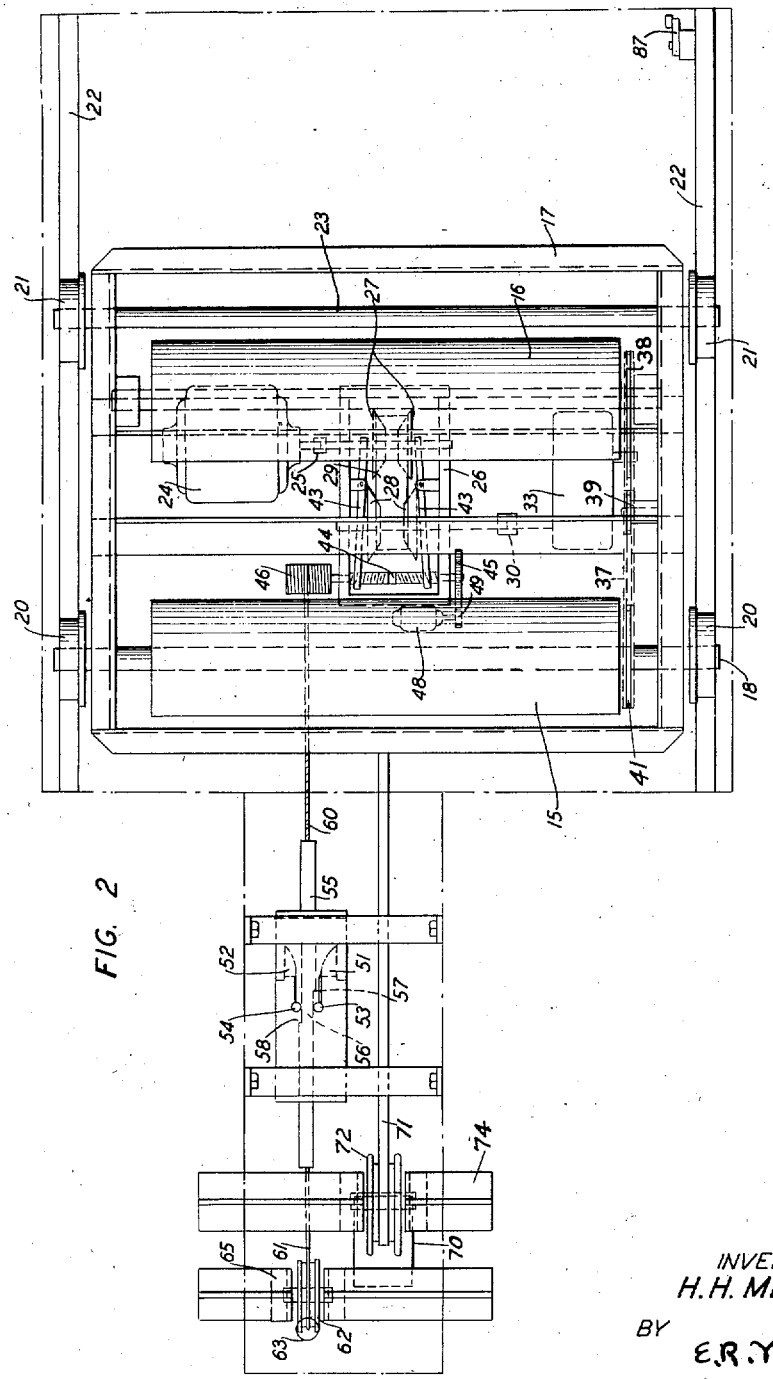
Fig. 2 is a top plan view of the apparatus.

Referring now to the drawings, attention is first directed to Figs. 1 and 2, Fig. 1 illustrating a takeup reel 10 upon which a material 11 is wound. In the present embodiment the material 11 is a lead covered cable passing from a supply, namely an extrusion nozzle 12 of an extruding apparatus 14. The reel 10 is supported by rollers 15 and 16 of a carriage 17, the rollers being mounted for rotation upon their respective shafts 18 and 19. In the present embodiment the shaft 18 also supports wheels 20, which cooperate with like wheels 21 for movably supporting the carriage 17, by being positioned to ride upon rails 22. The wheels 21 are mounted upon the ends of a shaft 23, which extends through the carriage frame 17 and serves as a support thereof.

A driving means is provided for the rollers 15 and 16 to cause the reel 10 to rotate in the direction of the arrow. This means includes a motor 24 supported in the carriage and having its shaft coupled at 25 with the input end of a variable transmission 26. The transmission 26 may be of the commercially known type, including variable cone pulley members 27 and 28 connected operatively by a belt 29. The pulley members 27 are movable on but keyed to the input shaft which is connected to the motor 24 through the coupling 25, while the pulley members 28 are keyed to the output shaft of the transmission for movement axially thereon. The output shaft is connected, through the aid of a coupling 30, to an input shaft of a speed reduction unit 33, the latter being of a desired type to cause rotation of the rollers 15 and 16 within a given speed range depending upon the constant speed of the output of the supply, namely the extrusion machine 14. The output end of the unit 33, indicated at 35, has a sprocket 36 mounted thereon for driving a continuous chain 37 which extends around a sprocket 38, fixed to the shaft 19, about an idler sprocket 39 rotatably supported, at 40, between the rollers 15 and 16, and finally about a sprocket 41 fixed to the shaft 18. At this point attention is directed to the fact that the wheels 20 are free to rotate on the shaft 18 and the shaft is, therefore, free to rotate relative to the wheels.

Returning now to the transmission 26, means is provided to vary the relationship of the pulley members 27 and 28, which are connected in the conventional manner through the aid of varying arms 43 connected in any suitable manner (not shown) to the pulley members and pivotally supported intermediate their ends so that simultaneous movement of the arms 43 will cause simultaneous relative movement of the pulley members 27 and 28, but in opposite directions. A threaded member 44, having right and left hand threads on the opposite halves thereof, threadedly connected to their respective arms 43, is rotatably supported in the frame of the transmission, with a gear 45 mounted on one end thereof and a capstan or drum 46 mounted on the other end thereof. A motor 48, having a pinion 49 mounted upon the shaft thereof and in interengagement with the gear 45, is of the reversible type for rotating the threaded member 44 in either direction.

The motor 48 is under the control of switches 51 and 52, which will hereinafter be more fully described in the description of the circuits of the wiring diagram. Arms 53 and 54 of the switches 51 and 52 are positioned to be actuated by a cam-like element 55 having a neutral position 56, wherein both switches are normally open, a cam portion 57 causing actuation or closing of the switch 51 through engagement with its arm 53 after movement of the carriage with the reel a given distance away from the supply, while a cam portion 58 is positioned to actuate the switch 52 through its arm 54 after movement of the carriage a given distance toward the supply.

The element 55 is connected to the capstan 46 by a cord 60 adapted to be wound upon the capstan or unwound thereon during rotation of the threaded member 44. Another cord 61, connected to the element 55, passes over a pulley 62 and has a weight 63 fixed to the end thereof. The weight provides a force sufficient to move the element 55 away from the supply during movement of the carriage in this direction or during unwinding of the cord 60 from the capstan 46. The pulley 62 is rotatably supported in a suitable bracket 65 and may be mounted beneath the floor level which is indicated at 66.

It will be noted that the carriage 17 together with the rails 22 supporting it and most of the mechanism carried thereby are disposed in a cavity or opening 67 in the floor so as to position the lower surface of the reel 10 at approximately floor level. Reels of this type, whether empty or full, are too heavy to be manually lifted and must necessarily be rolled onto and off the apparatus.

Means is provided to create a given tension in the material 11. This means includes a weight 70 supported by a cable 71 which passes over a pulley or sheave 72 and is connected in any suitable manner to the carriage 17. The pulley or sheave 72 is rotatably supported by a bracket 74.

Figure 3:
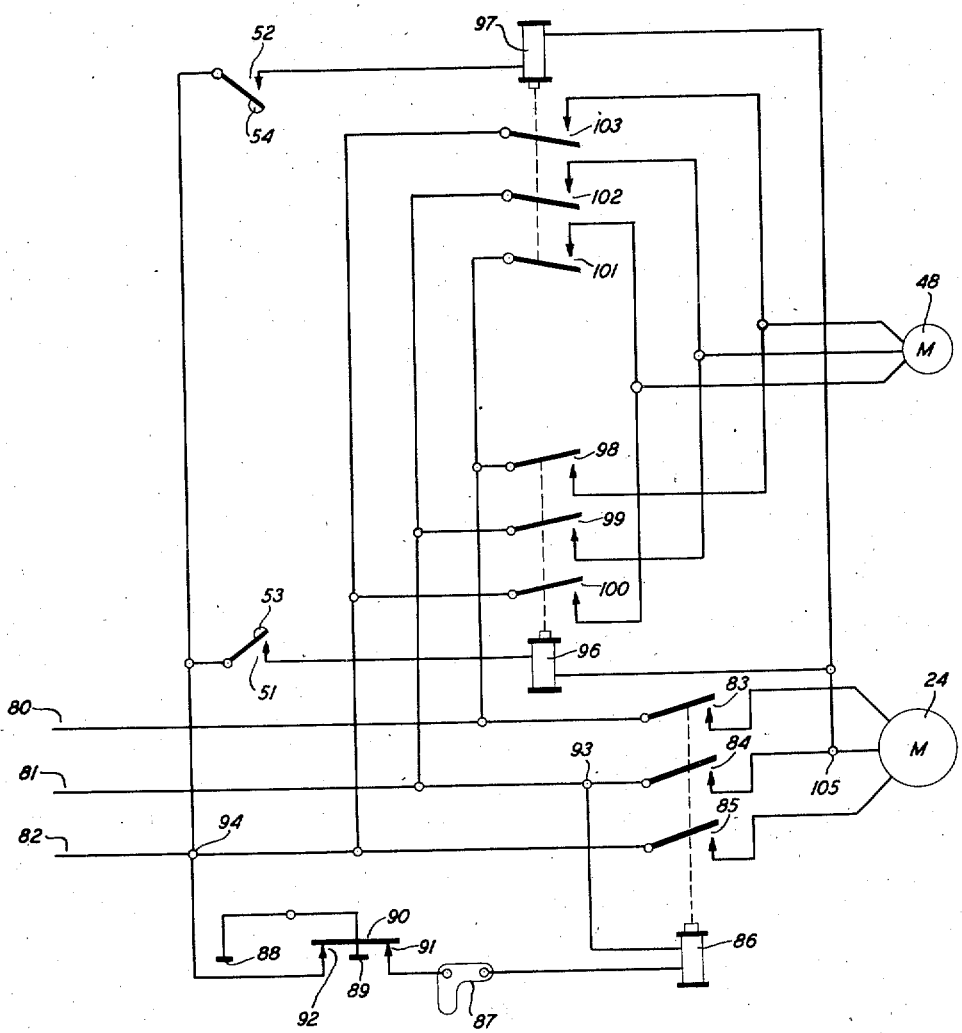
Fig. 3 is a wiring diagram illustrating the control circuits for the apparatus.

Attention is now directed to the wiring diagram shown in Fig. 3. Lines 80, 81 and 82 from a suitable source of electrical energy (not shown) may be considered as the main supply lines for the motors 24 and 48 as well as the relays controlling these motors. Normally open contacts 83, 84 and 85 in the lines 80, 81 and 82, respectively, to the motor 24 are under the control of a relay 86. A limit switch 87, which is in a circuit including the relay 86, is normally closed and, as illustrated in Figs. 1 and 2, is disposed in the path of the carriage 17 to be actuated thereby should the supply of material stop, such as by the discontinuation of the extrusion of the lead covered cable, during the continuation of the driving or rotating of the reel 10, resulting in the movement of the carriage with the reel toward the supply. Start and stop buttons 88 and 89 of a main switch 90 control the closing and opening of contacts 91 and 92, to complete a circuit from line 81 at connection 93, through relay 86, normally closed limit switch 87, contacts 91 and 92 of the closed switch 90, to line 82 at connection 94. Thus upon closing of the switch 90, relay 86 is energized to close its contacts 83, 84 and 85, completing the circuits to the motor 24 and conditioning circuits to relays 96 and 97 which are to control the circuits for the motor 48 in varying the transmission 26. Relay 96 controls normally open contacts 98, 99 and 100, while relay 97 controls normally open contacts 101, 102 and 103. Through the arrangement of the circuits to the motor 48 extending to these contacts from lines 80, 81 and 82, the motor 48 will be caused to rotate in one direction when relay 96 is energized and be caused to rotate in the opposite direction when relay 97 is energized. Relay 96 is under the direct control of switch 51, while relay 97 is under the direct control of switch 52.

Considering now the operation of the apparatus, let it be assumed that a reel 10 is disposed upon the rollers 15 and 16 of the carriage 17 and that the end of the material or cable 11 is secured thereto. Let it further be assumed that the material 11 is freed from the supply or extrusion machine at a constant rate of speed. During the preparation of the apparatus for operation, including the positioning of the reel upon the rollers and the securing of the leading end of the material to the reel, the carriage will be in its extreme position at the left, having been pulled to this loading and unloading position by the weight 70. By pressing the start button 88, the circuit is completed through the relay 86, closing its contacts to complete the circuits to the motor 24, thus energizing the main drive motor. The driving force received from the motor is transmitted through the transmission 26, the speed reduction unit 33, to the sprocket 36, for driving the chain 37 to cause rotation of the rollers 15 and 16 in like directions to cause rotation of the reel 10 in the direction of the arrow. The first motion of the reel will tend to move the carriage to its normal running position. If the takeup of the material on the reel should be at a constant rate equal to the rate of speed the material is delivered from the supply, there would be no variation in the transmission 26. However, this cannot exist, as each layer of the material on the reel builds up the effective diameter of the reel, requiring a reduction in the speed of rotation thereof. As this result occurs, the reel tends to climb the material, forcing the carriage toward the supply, resulting in the movement of the element 55 to the right (Fig. 2) and the actuation of the switch 52. The closing of switch 52, by the cam portion 58 of the element 55 engaging the arm 54, will complete a circuit from line 81 through closed contact 84, connection 105, relay 97, closed switch 52, to line 82 at connection 94. Energization of the relay 97 closes its contacts 101, 102 and 103, completing a circuit through the motor 48 to cause it to rotate the threaded member 44 of the variable transmission 26, adjusting the cone pulley members 27 and 28 to reduce the speed of the output of the transmission and thus reduce the speed of rotation of the rollers 15 and 16 and the reel 10. The function of the capstan 46 on the threaded member 44 is to cause the control element 55 to return to its normal position during variation in the transmission unit, to eliminate overrunning in the speed setting mechanism. Thus in the present illustration the capstan 46 is rotated in a direction to free or unwind an added length of the cord 60 so that the weight 63 may move the control element 55 to its normal position to cause opening of the switch 52. During this interval, however, an adjustment has been made in the variable transmission and the speed of rotation of the reel 10 has been decreased. This operation is repeated as each layer of the material on the reel begins decreasing the speed of the output of the transmission and thus decreasing the speed of the driving means connected therewith between the reel 10 and the transmission.

The weight 70, as heretofore described, applies a given force to the carriage, tending to move it away from the supply, thus creating a given tension in the material. Thus, if anything should occur to create a slack in the material, the weight 70 will move the carriage to the left, effecting variation in the position of the control element 55, as this movement of the carriage will move also the capstan 46 and allow the weight 63 to move the element 55 to the left (Fig. 2), the latter resulting in the closing of switch 51 through the engagement of the cam portion 57 with the arm 53 of the switch. The closing of switch 51 results in the energization of the relay 96, the operation of its contacts 98, 99 and 100 completing circuits to energize the motor 48 in a reverse direction from that previously described to adjust the variable transmission 26 and increase the speed of rotation of the reel.

If the supply should stop, that is, if the extrusion machine should discontinue extrusion of the material for the forming of a sheath on the cable, continuation of the rotation of the reel 10 would cause the reel to climb the material and move the carriage 17 toward the supply until the limit switch 87 is actuated, at which time the circuit including the relay 86 is opened, allowing the contacts thereof to open and deenergize the motor 24. Upon resumption of the delivery of the material from the supply, the weight 70 will move the carriage 17, together with the reel, away from the supply, freeing the limit switch 87 so that it may close, to again complete the circuit through the relay 86 to cause it, through energization, to close its contacts and again energize the motor 24. It will be apparent, therefore, that during the normal operation of the apparatus with the carriage in any position, other than at its extreme position at the right during a time when the delivery of the material has stopped, the carriage has two forces acting upon it in a given plane, one being the force of the weight 70 to move it away from the supply, the other being the tension existing in the material tending to pull it toward the supply, so that the existing tension in the material equals the force of the weight plus or minus the friction forces necessary to move the carriage, and as a result a substantially constant tension is present in the material, this tension being variable with variations in the weight 70.

If the cable on material 11 be cut or run out, the carriage, through the force of the weight 70, will move to the extreme position at the left (Figs. 1 and 2), which may be termed the loading position, for the removal of the full reel from the carriage and the placing of an empty reel thereon.

Although specific improvements of the invention have been shown and described, it will be understood that they are but illustrative and that various modifications may be made therein without departing from the scope and spirit of this invention as defined by the appended claims.

What is claimed is:

1. A material handling apparatus comprising a carriage, rollers supporting the carriage for movement relative to a normal winding position, means supported by the carriage to rotatably support a reel, means supported by the carriage and including a variable transmission to drive the reel supporting means to rotate the reel in a direction to wind a material thereon received from a supply at a constant rate of speed, and means actuable by the movement of the carriage from the normal position in one direction to cause variation in the transmission of the driving means to decrease the speed of rotation of the reel supporting means and the reel.

2. A material handling apparatus comprising a carriage, rollers supporting the carriage for movement relative to a normal winding position, means supported by the carriage to rotatably support a reel, means supported by the carriage and including a variable transmission to drive the reel supporting means to rotate the reel in a direction to wind a material thereon received from a supply at a constant rate of speed, and means actuable by the movement of the carriage from the normal position in one direction to cause variation in the transmission of the driving means to increase the speed of rotation of the reel supporting means and the reel.

3. A material handling apparatus comprising a carriage for rotatably supporting a reel, means to support the carriage for movement thereof in a given plane relative to a supply of material, an electric motor, an electric circuit therefor, means operable by the motor to rotate the reel to wind the material received from the supply at a constant rate of speed thereon, means actuable by the movement of the carriage in one direction from a normal position to cause variation in the said operable means to decrease the speed of rotation of the reel, and a switch actuable by the carriage upon movement thereof a given distance from the normal position to cause opening of the motor circuit and deenergization of the motor.

4. A material handling apparatus comprising a carriage mounted for movement in a given path relative to a normal winding position, means supported by the carriage to rotatably support a reel, means supported by the carriage and including a variable transmission to drive the reel supporting means to rotate the reel in a direction to wind a material thereon received from a supply at a constant rate of speed, and means electrically operable by the movement of the carriage from the normal position toward the supply to cause variation in the transmission to decrease the speed of rotation of the reel supporting means and the reel.

5. A material handling apparatus comprising a carriage mounted for movement in a given path relative to a normal winding position, means supported by the carriage to rotatably support a reel, means supported by the carriage and including a variable transmission to drive the reel supporting means to rotate the reel in a direction to wind a material thereon received from a supply at a constant rate of speed, and means electrically operable by the movement of the carriage from the normal position away from the supply to cause variation in the transmission to increase the speed of rotation of the reel supporting means and reel.

6. A material handling apparatus comprising a carriage mounted for movement in a given path relative to a normal winding position, means supported by the carriage to rotatably support a reel, means supported by the carriage and including a variable transmission to drive the reel supporting means to rotate the reel in a direction to wind a material thereon received from a supply at a constant rate of speed, an electrical unit operable to vary the transmission, a switch in a circuit with the unit mounted at a fixed position relative to the carriage, and means movable with the carriage relative to the switch to close the switch when the carriage moves out of the winding position.

7. A material handling apparatus comprising a carriage mounted for movement in a given path relative to a normal winding position, means supported by the carriage to rotatably support a reel, means supported by the carriage and including a variable transmission to drive the reel supporting means to rotate the reel in a direction to wind a material thereon received from a supply at a constant rate of speed, an electrical unit operable to vary the transmission, a switch in a circuit with the unit mounted at a fixed position relative to the carriage, and means movable with the carriage relative to the switch to close the switch when the carriage moves out of the winding position, and to hold the switch closed until the carriage returns to the winding position.

HARRY H. MERWIN.

REFERENCES CITED

The following references are of record in the file of this patent:

UNITED STATES PATENTS

| Number | Name | Date |
| --- | --- | --- |
| 2,206,246 | Bannister et al. | July 2, 1940 |
| 1,672,732 | Ray | June 5, 1928 |
| 2,018,842 | Hart | Oct. 29, 1935 |
| 2,162,527 | Cook | June 13, 1939 |
| 1,763,092 | Clarke | June 10, 1930 |
| 2,167,549 | Hudson | July 25, 1939 |
| 551,255 | Briggs | Dec. 10, 1895 |
| 2,203,946 | Doescher | June 11, 1940 |
| 1,299,566 | Emory | Apr. 8, 1919 |
| 1,093,913 | Church | Apr. 21, 1914 |